US011873949B2

(12) United States Patent
Ligonesche et al.

(10) Patent No.: US 11,873,949 B2
(45) Date of Patent: Jan. 16, 2024

(54) VALVE AND DEVICE FOR SUPPLYING PRESSURIZED FLUID

(71) Applicant: L'Air Liquide, Société Anonyme pour l'Etude et l'Exploitation des Procédés Georges Claude, Paris (FR)

(72) Inventors: Renaud Ligonesche, Herblay (FR); Olivier Ondo, Palaiseau (FR); Antoine Frenal, Ezanville (FR); Johan Broechler, Lintgen (LU); Morgan Lamiable, Lintgen (LU); Arnaud Kaichinger, Lintgen (LU)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/494,502

(22) Filed: Oct. 5, 2021

(65) Prior Publication Data

US 2022/0107058 A1 Apr. 7, 2022

(30) Foreign Application Priority Data

Oct. 5, 2020 (FR) ...................................... 2010129

(51) Int. Cl.
*F17C 13/04* (2006.01)

(52) U.S. Cl.
CPC ........ *F17C 13/04* (2013.01); *F17C 2205/037* (2013.01); *F17C 2205/0329* (2013.01);
(Continued)

(58) Field of Classification Search
CPC .............. F17C 13/04; F17C 2205/0329; F17C 2205/037; F17C 2205/0394; F17C 2223/0123
(Continued)

(56) References Cited

U.S. PATENT DOCUMENTS

| | | | | |
|---|---|---|---|---|
| 3,035,605 A * | 5/1962 | Ninnelt | F16K 35/00 | 251/111 |
| 6,578,645 B2 * | 6/2003 | Fahr | B25F 5/00 | 173/169 |

(Continued)

FOREIGN PATENT DOCUMENTS

| | | |
|---|---|---|
| FR | 2 991 750 | 12/2013 |
| FR | 3 054 289 | 1/2018 |

(Continued)

OTHER PUBLICATIONS

French Search Report for corresponding FR 2010129, dated Jun. 29, 2021.

*Primary Examiner* — Angelisa L. Hicks
(74) *Attorney, Agent, or Firm* — Elwood L. Haynes

(57) ABSTRACT

A valve for pressurized fluid housing a fluid circuit having an upstream end and a downstream end and a valve for controlling the flow rate in the circuit that is controlled by a movable actuating member in order to control the opening or the closing, the valve having a lower end provided with movable coupling member(s) intended to cooperate with one or more complementary coupling members on a gas source or a circuit, the valve further comprising a member for locking the coupling member(s) that is mounted movably on the body of the valve between a first position not blocking the movement of the coupling member(s) and a second position blocking the movement of the coupling member(s).

6 Claims, 4 Drawing Sheets

(52) U.S. Cl.
CPC ................. *F17C 2205/0394* (2013.01); *F17C 2223/0123* (2013.01)

(58) Field of Classification Search
USPC ..................................... 141/360; 251/89–116
See application file for complete search history.

(56) References Cited

U.S. PATENT DOCUMENTS

| | | | | |
|---|---|---|---|---|
| 2017/0254420 A1* | 9/2017 | Frenal | ..................... | F16K 1/304 |
| 2019/0219227 A1 | 7/2019 | Frenal et al. | | |
| 2019/0242528 A1 | 8/2019 | Frenal et al. | | |
| 2020/0256516 A1 | 8/2020 | Ligonesche et al. | | |

FOREIGN PATENT DOCUMENTS

| | | | |
|---|---|---|---|
| FR | 3 054 290 | 1/2018 | |
| FR | 3 092 643 | 8/2020 | |
| WO | WO-2018015627 A1 * | 1/2018 | .............. F17C 13/04 |

* cited by examiner

VALVE AND DEVICE FOR SUPPLYING PRESSURIZED FLUID

CROSS REFERENCE TO RELATED APPLICATIONS

This application claims priority to FR 2010129, filed Oct. 5, 2020, the entire contents of which are incorporated herein by reference.

BACKGROUND

The invention relates to a valve and a device for supplying pressurized fluid.

The invention relates more particularly to a valve for pressurized fluid, with or without integrated pressure reducer, comprising a body housing a fluid circuit having an upstream end intended to be placed in communication with a pressurized fluid reserve and a downstream end intended to be placed in communication with a user apparatus, the circuit comprising a valve for controlling the flow rate in the circuit, the valve being controlled by a movable actuating member in order to control the opening or the closing thereof, the valve comprising a lower mounting end provided with movable coupling member(s) intended to cooperate with one or more complementary coupling members to form a quick connection system between the valve and a gas source or a circuit, the valve further comprising a member for locking the coupling member(s) that is mounted movably on the body of the valve between a first position and a second position with respect to the body, with, in its first position, the locking member not blocking the movement of the coupling member(s) and, in its second position, the locking member blocking the movement of the coupling member(s), the locking member comprising a first end intended to cooperate with the coupling member(s) for the blocking thereof when said locking member is in its second position, and a second gripping end intended to manually move the locking member into its first position, the valve comprising, at an upper end, a fixed head.

Document FR3054290A1 describes such a valve and device.

The member for locking and unlocking the coupling that is described in that document is a cylindrical sleeve accessible on the periphery of the valve.

SUMMARY

One object of the invention is to propose a more ergonomic mechanism and notably a member less subject to any impacts and deformations and less susceptible to allowing the intrusion of unwanted bodies into recesses or apertures of the valve.

To this end, the valve according to the invention, otherwise conforming to the generic definition given thereof by the preamble above, is essentially characterized in that the gripping end is situated in a housing of the head and is movable in the head between a top position at least partially retracted into the head when the locking member is in its first position, and a bottom position projecting at least partially beneath the head when the locking member is in its second position.

Furthermore, embodiments of the invention may comprise one or more of the following features:

- the valve comprises a fixed rigid shell arranged around the body and around at least part of the locking member, with the exception of the gripping end,
- the gripping end comprises one or more parts situated laterally with respect to a central axis of the valve oriented in the lower/upper direction of the valve,
- the gripping end comprises two parts situated respectively at two opposite lateral ends of the head, that is to say on either side of the central axis of the valve oriented in the lower/upper direction of the valve,
- the gripping end comprises two parts situated respectively at two opposite lateral ends of the head, that is to say on either side of the central axis of the valve oriented in the lower/upper direction of the valve,
- the coupling member(s) comprise balls or claws,
- the locking member is movable in translation on the body of the valve,
- the circuit of the valve comprises a member for reducing pressure to a fixed or adjustable predetermined value,
- the locking member is urged towards its second position by a return member.

The invention also relates to a device for supplying pressurized fluid, notably pressurized gas, comprising a first functional assembly comprising at least one pressurized fluid cylinder connected to a first valve, the first valve comprising an internal fluid circuit comprising an isolation valve, the device comprising a second valve forming a physical entity that is separate from the first valve, the second valve being provided with an internal fluid circuit, the first valve and the second valve comprising respective coupling members forming a removable male/female quick connection system between the second valve and the first valve, the second valve being a valve according to any one of the features above or below.

The invention can also relate to any alternative device or method comprising any combination of the features above or below within the scope of the claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
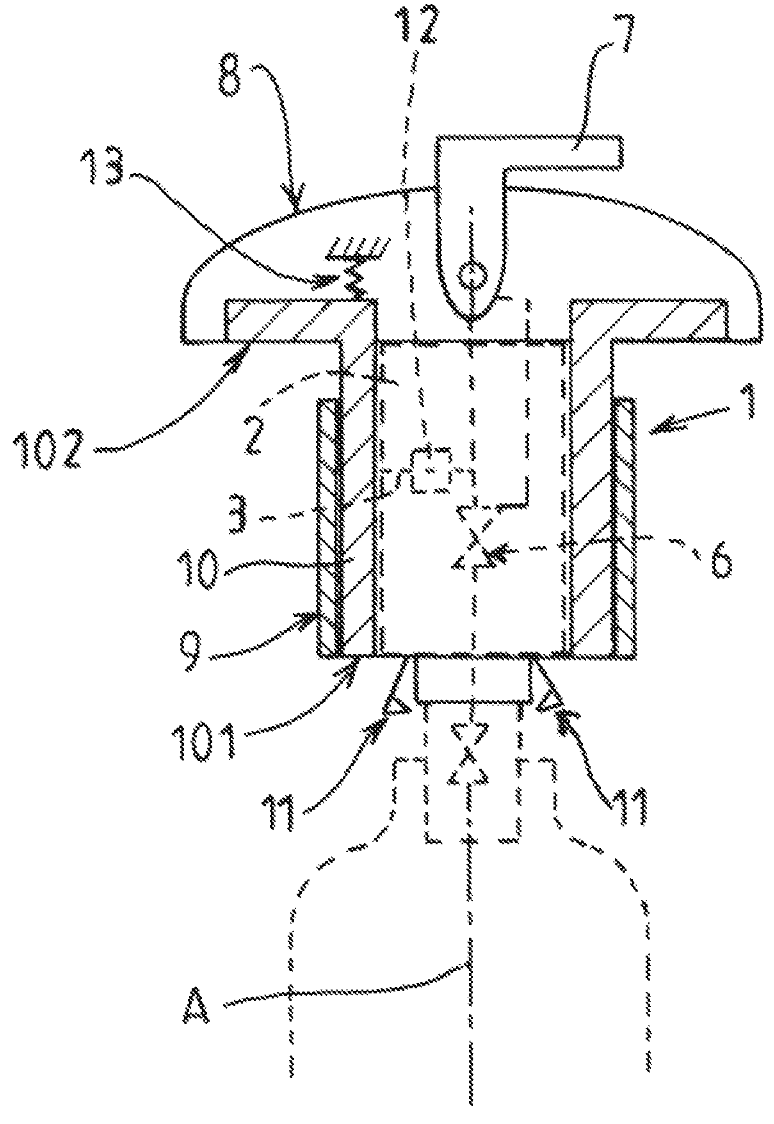
FIG. 1 depicts a side view, in schematic and partial section, illustrating one exemplary embodiment of a valve according to the invention connected to a pressurized fluid source and in a first operating configuration.

The valve 1 for pressurized fluid depicted schematically may be a valve with or without integrated pressure reducer.

The valve 1 comprises a body 2 housing a fluid circuit 3 having an upstream end 4 intended to be placed in communication with a reserve of pressurized fluid (for example pressurized gas) and a downstream end 5 intended to be placed in communication with a user apparatus (for example at an outlet connection).

For preference, the body 2 is a single functional entity that cannot be taken apart notably when the valve is in the use configuration. The valve may notably be connected to a cylinder 20 or a collection of pressurized fluid cylinders.

The circuit 3 may in the conventional way comprise a control valve 6 controlling the flow rate in the circuit 3. The valve 6 may be an isolation valve. As illustrated schematically, a flow rate or pressure regulator 12 may also be provided in the circuit 3.

At least the valve 6 may be operated by a movable actuating member 7 (manual and/or remote-controlled) to control the opening or the closing of this valve. In the example depicted, this actuating member 7 is a lever pivoting on the body 2. Of course, this actuating member 7 could be a rotary hand wheel and/or a push-button, for example.

The valve 1 comprises a lower mounting end provided with movable coupling members 11 intended to cooperate with complementary coupling members in order to form a quick connection system between the valve 1 and a gas source or a circuit.

The movable coupling members 11 comprise, for example, movable elements (balls and/or claws for example) which catch on mating housings.

The valve 1 comprises a locking and unlocking member 10 mounted movably around the body 2 of the valve 1 between a first position and a second position with respect to the body 2. In its first position, the locking member 10 does not block the movement of the coupling member(s) 11. In this position, the quick connection is not locked and the valve 1 can be separated mechanically from its support and can notably be connected to a mating support. In its second position, the locking member 10 blocks the movement of the coupling member(s) 11. In this position, the mechanical connection is locked and the valve 1 cannot be separated mechanically from its support without again moving the locking member 10 towards its first position (this is a safety measure for the mechanical connection allowing a transfer of high-pressure fluid from or to the valve 1).

Figure 2:
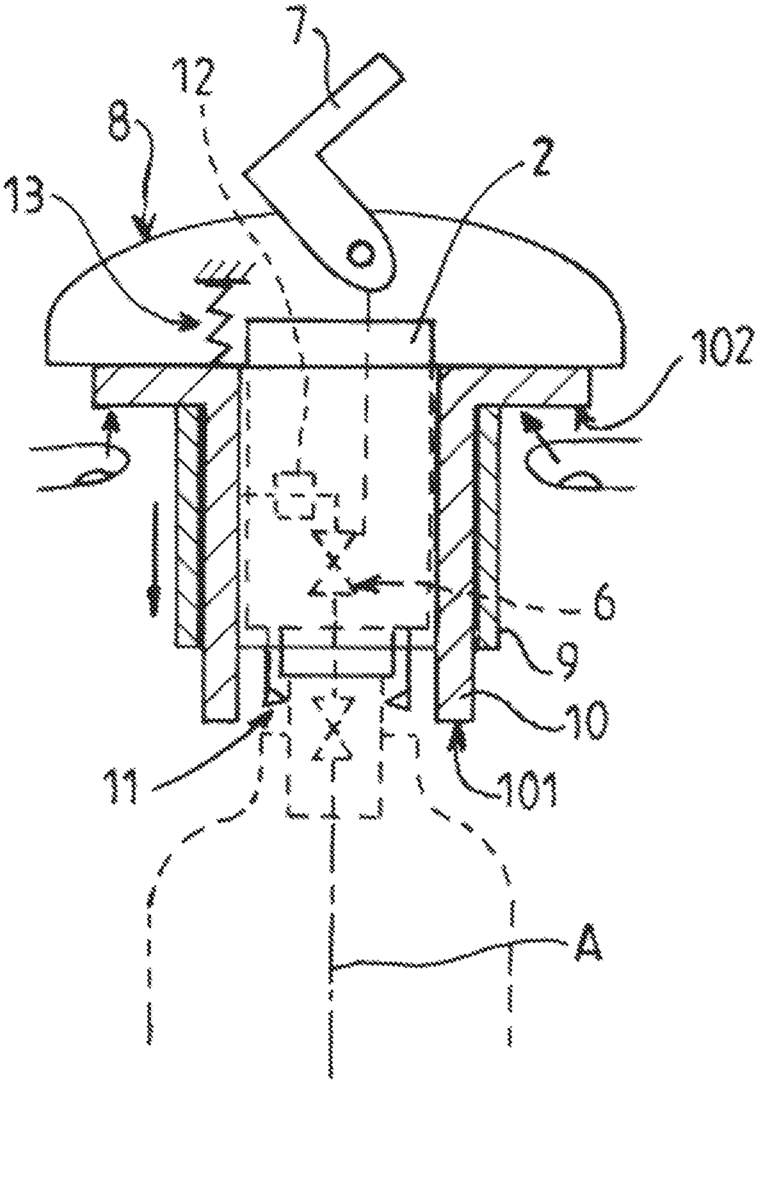
FIG. 2 depicts a view similar to that of FIG. 1, in which the valve is in a second operating configuration.

For example, in its first position, the locking member 10 does not block the movement of the movable coupling members 11 (connection-disconnection is possible, cf. FIG. 1, with, for example, parting of the coupling members 11), whereas in its second position, the locking member 10 blocks the movement of the movable members 11 (disconnection and possibly connection are impossible, cf. FIG. 2, for example parting being impossible).

For example, depending on its position relative to the coupling members 11, the locking member 10 forms or does not form a stop to the movement of these members (for the parting thereof, for example).

For preference, the locking member 10 is movable in translation vertically (top/bottom) on the body 2 of the valve 1. For example, the locking member 10 is urged towards its second position (bottom) by a return member 13 such as a spring, for example. During the connection of the lower mounting end on a support having complementary coupling members, the locking member 10 is released (for example by pushing on its lower end) and moves automatically into the locking position (second position).

As illustrated, the locking member 10 may comprise a tubular portion arranged around at least part of the body 2 of the valve 1.

The locking member 10 comprises a first lower end 101 intended to block the coupling member(s) 11 in the second position, and a second upper gripping end 102 intended to manually move the locking member 10 into its first position.

In the foregoing and what follows, "upper" and "lower" denote the relative vertical positions of the elements when the valve is in the use position (mounted vertically on the upper end of a reservoir for example, for example along a vertical axis A).

The valve 1 comprises, at an upper end, a head 8 which is fixed with respect to the body 2. The head 8 forms, for example, a T-shaped lateral projection vertically in the manner of a mushroom cap.

According to one advantageous distinctive feature, the gripping end 102 is situated in a housing of the head 8 and is movable in the head 8 between a top position at least partially retracted into the head 8 when the locking member 10 is in its first position (cf. FIG. 1), and a bottom position projecting at least partially beneath the head 8 when the locking member 10 is in its second position (cf. FIG. 2).

In this way, the gripping end 102 can be actuated manually upwards (raised by the tip of the fingers as schematically illustrated in FIG. 2). For example, this movement from the second position to the first position occurs by grabbing the top of the head 8 and the bottom of the gripping end 102 by the hand.

As illustrated, the gripping end 102 preferably comprises two parts situated respectively at two opposite lateral ends of the head 8. That is to say on either side of the central axis A oriented in the lower/upper direction of the valve 1. Thus, the manipulation of the locking member 10 can be carried out with two hands at these two sides.

For preference, the valve 1 comprises a fixed rigid outer shell 9 arranged around the body 2 and around at least part of the locking member 10, with the exception of the gripping end 102, This shell 9 is, for example, fixed with respect to the body and hides the majority of the locking member 10 and the orifices and mechanisms, with the exception of the gripping end 102 and possibly of the lower end of the locking member 10.

This protects the valve 1 and notably the locking member 10 and the mechanisms on the periphery of the body 2 of the valve. This allows protection notably against the intrusion of dirt, fingers or the like into hollow spaces.

Figure 3:
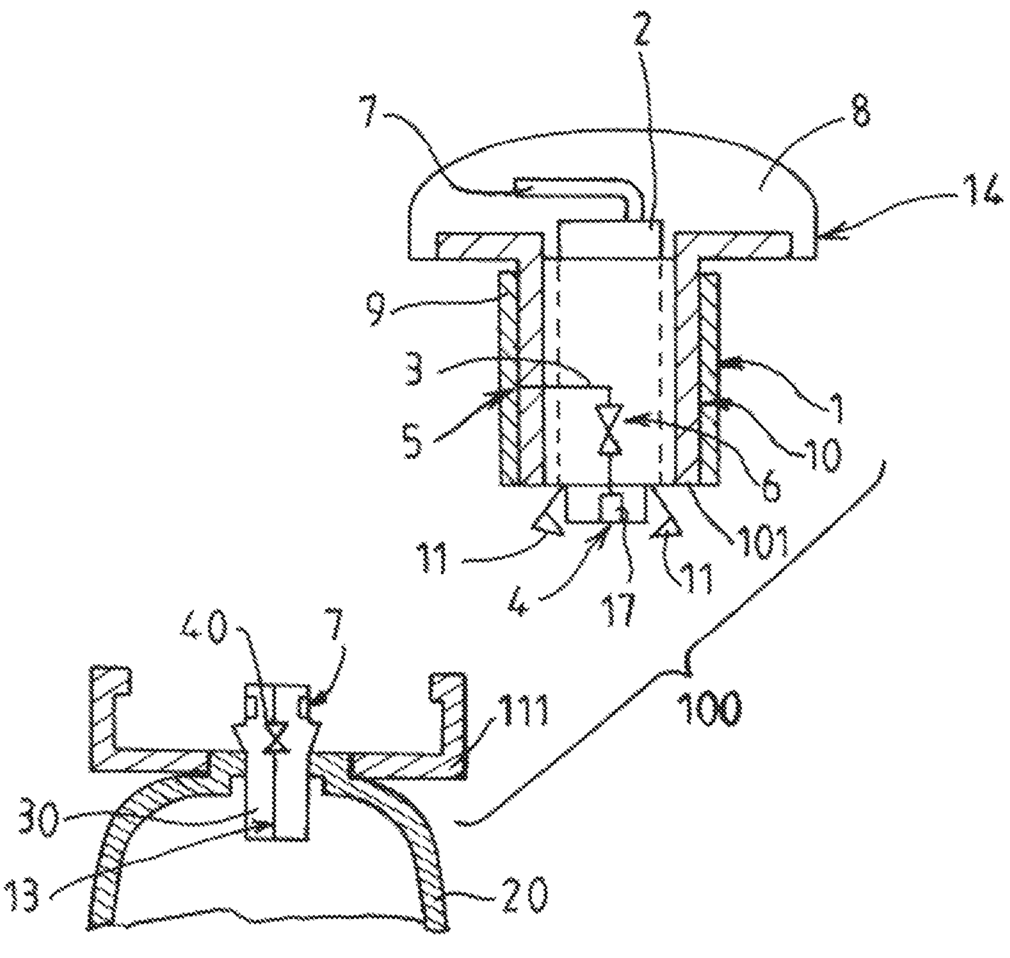
FIG. 3 depicts a schematic and partial sectional side view, illustrating another exemplary embodiment of the valve according to the invention and of a pressurized fluid source, the valve being separated from said fluid source.
Figure 4:
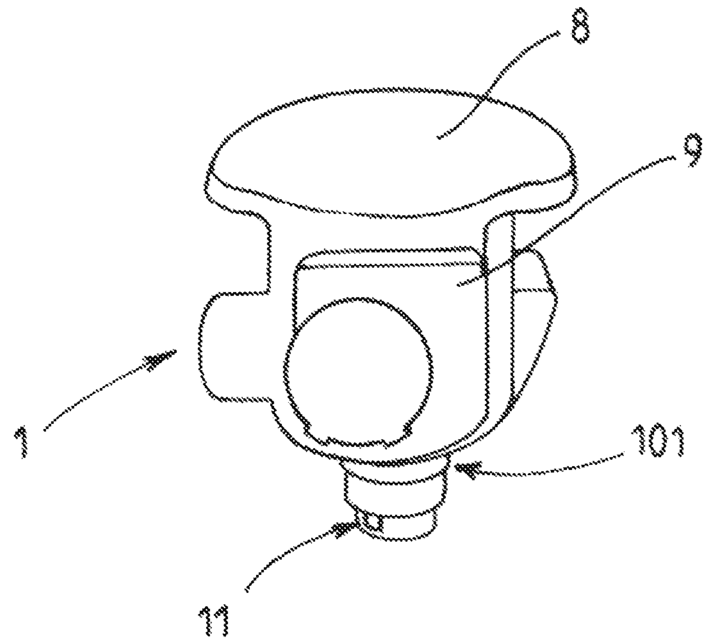
FIG. 4 depicts a schematic and partial sectional side view of another embodiment of the valve in the first operating configuration.
Figure 5:
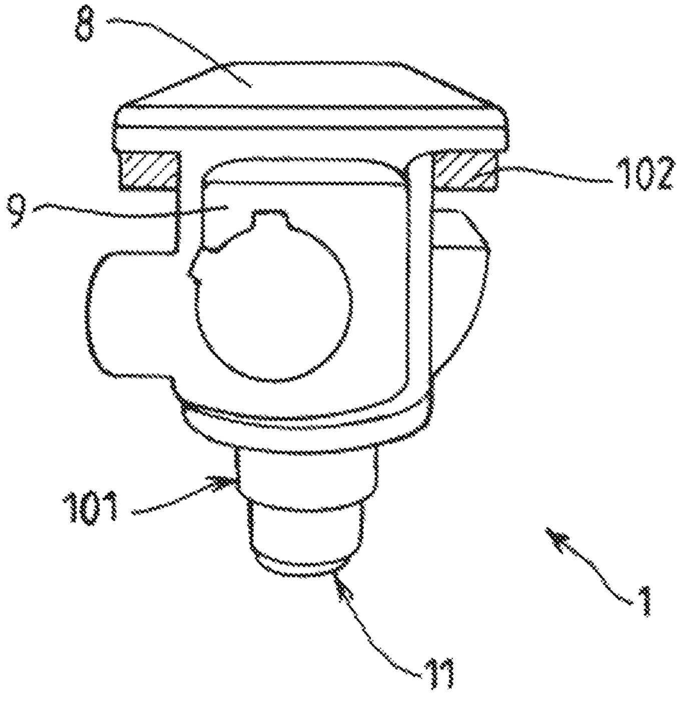
FIG. 5 depicts a view similar to the valve of FIG. 4 in the second operating configuration.

FIG. 3 illustrates a device 100 for supplying pressurized fluid, notably pressurized gas, comprising a first functional assembly 20, 30, 111 comprising at least one pressurized fluid cylinder 20 which is connected to a first valve 30 and provided with a cap 111. This first assembly is intended to cooperate, where appropriate, with a second valve 1 as described above.

The second valve 1 forms a physical entity that is separate from the first valve 30. The second valve 1 as described hereinabove can be connected (mechanically and fluidically) to the first valve 30. The first valve 30 and the second valve 1 thus possess respective coupling members 7, 11 forming a removable male/female quick connection system between the second valve 1 and the first valve 30.

The first valve 30 comprises an internal fluid circuit 13 comprising, for example, at least one isolation valve 40. In addition to or instead of the valve 6, the second valve 1 may comprise a movable member 17 (such as a valve pusher) for controlling the opening or closing of the isolation valve 40 of the first valve 30. The movable member 17 is, for example, controlled by the actuating member 7 (lever 7 or equivalent). When the two valves 1, 30 are connected, a fluidic connection can be established between the internal circuits 13, 3 of the two valves.

When the second valve 1 is connected (mounted) on the first valve 30 (cf. FIG. 1 and FIG. 2), the locking member 10 is moved downwards in order to lock the quick connection. To separate the two valves, the user moves the locking member 10 upwardly as described above in order to release the coupling members 11.

The movement of the locking member 10 between its first position (cf. FIG. 1) and its second position with respect to the body 2 (cf. FIG. 2) causes the gripping end to emerge at the bottom of the head 8.

This projection or non-projection of the gripping end at the bottom of the head 8, apart from its ergonomics, visually informs the user about the state of the mechanical connection of the valve (locking or non-locking).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A valve for pressurized fluid, with or without integrated pressure reducer, comprising:

a valve body housing a fluid circuit having an upstream end configured to be placed in communication with a pressurized fluid reserve and a downstream end configured to be placed in communication with a user apparatus, the circuit comprising a valve for controlling the flow rate in the circuit, the valve being controlled by a movable actuating member in order to control the opening or the closing thereof, the valve comprising:

a lower mounting end provided with movable coupling member(s) configured to cooperate with one or more complementary coupling members to form a quick connection system between the valve and a gas source or a circuit, a locking member for locking the coupling member(s) that is mounted movably on the valve body between a first position and a second position with respect to the valve body, with, in the first position, the locking member not blocking the movement of the coupling member(s) and, in the second position, the locking member blocking the movement of the coupling member(s), the locking member comprising a first end configured to cooperate with the coupling member(s) for the blocking thereof when said locking member is in the second position, and a second gripping end configured to manually move the locking member into the first position, at an upper end, a fixed head, wherein the gripping end is situated in a housing of the head and is movable in the head between a top position at least partially retracted into the head when the locking member is in the first position, and a bottom position projecting at least partially beneath the head when the locking member is in the second position.

2. The valve according to claim 1, further comprising a fixed rigid shell arranged around the valve body and around at least part of the locking member, with the exception of the gripping end.

3. The valve according to claim 1, wherein the coupling member(s) comprise balls or claws.

4. The valve according to claim 1, wherein the locking member is movable in translation on the valve body.

5. The valve according to claim 1, wherein the circuit of the valve comprises a member for reducing pressure to a fixed or adjustable predetermined value.

6. The valve according to claim 1, wherein the locking member is urged towards the second position by a return member.

* * * * *